US012573401B1

(12) United States Patent
Jalalvand

(10) Patent No.: US 12,573,401 B1
(45) Date of Patent: Mar. 10, 2026

(54) NEURAL NETWORK BASED CONVERSATION-AWARE AUTOMATIC SPEECH RECOGNITION

(71) Applicant: Interactions LLC, Franklin, MA (US)

(72) Inventor: Shahab Jalalvand, Summit, NJ (US)

(73) Assignee: Interactions LLC, Franklin, MA (US)

( * ) Notice: Subject to any disclaimer, the term of this patent is extended or adjusted under 35 U.S.C. 154(b) by 0 days.

(21) Appl. No.: 17/246,250

(22) Filed: Apr. 30, 2021

(51) Int. Cl.
| | |
|---|---|
| *G10L 15/26* | (2006.01) |
| *G06N 3/08* | (2023.01) |
| *G10L 15/02* | (2006.01) |
| *G10L 15/04* | (2013.01) |
| *G10L 15/06* | (2013.01) |
| *G10L 25/30* | (2013.01) |

(52) U.S. Cl.
CPC ................ *G10L 15/26* (2013.01); *G06N 3/08* (2013.01); *G10L 15/02* (2013.01); *G10L 15/04* (2013.01); *G10L 15/063* (2013.01); *G10L 25/30* (2013.01); *G10L 2015/0631* (2013.01)

(58) Field of Classification Search
CPC ......... G10L 15/26; G10L 15/02; G10L 15/04; G10L 15/063; G10L 25/30; G10L 2015/0631; G06N 3/08
See application file for complete search history.

(56) References Cited

U.S. PATENT DOCUMENTS

| | | | | |
|---|---|---|---|---|
| 9,324,323 | B1 * | 4/2016 | Bikel | .................... G10L 15/197 |
| 10,096,317 | B2 | 10/2018 | Selfridge et al. | |

| | | | | |
|---|---|---|---|---|
| 10,540,967 | B2 * | 1/2020 | Perez | ...................... G06F 40/35 |
| 10,832,658 | B2 * | 11/2020 | Gunasekara | ........... G06N 3/044 |
| 11,151,332 | B2 * | 10/2021 | Nogima | ................ G10L 15/183 |
| 2017/0287478 | A1 * | 10/2017 | Schulz | .................... G10L 15/22 |
| 2020/0004878 | A1 * | 1/2020 | Beaumont | ............ G06F 16/685 |
| 2020/0218780 | A1 * | 7/2020 | Mei | .......................... G06F 40/30 |

OTHER PUBLICATIONS

Zhang, Xiang, and Qiang Yang. "Transfer hierarchical attention network for generative dialog system." International Journal of Automation and Computing 16.6 (2019): 720-736. (Year: 2019).*

(Continued)

*Primary Examiner* — Bhavesh M Mehta
*Assistant Examiner* — Nandini Subramani
(74) *Attorney, Agent, or Firm* — Fenwick & West LLP

(57) ABSTRACT

A system uses a machine learning based model such as a neural network for transcribing audio inputs. The system receives a set of audio inputs representing utterances of a conversation. For each conversation, the system determines a dialogue state for each utterance. The system uses a hierarchical language model for transcribing audio inputs of an online conversation using the received conversations. The hierarchical language model includes a top-level language model and a plurality of lower-level language model. The training is performed by (1) training the top-level language model using sequences of corresponding dialogue state, each sequence of dialogue states for a conversation, and (2) for each dialogue state, training a lower-level language model using utterances having that dialogue state. The system executes the hierarchical language model to transcribe audio input of new conversations.

20 Claims, 10 Drawing Sheets

(56)           References Cited

OTHER PUBLICATIONS

1904Labs, "Generative Pretrained Transformer," Date Unknown, 3 pages, [Online] [Retrieved on Jun. 9, 2021] Retrieved from the Internet <URL: https://1904labs.com/generative-pretrained-transformer/>.

Allen Institute for AI, "ELMo: Deep contextualized word representations," 2018, four pages, [Online] [Retrieved on Jun. 9, 2021] Retrieved from the Internet <URL: https://allennlp.org/elmo>.

Devlin, J. et al., "BERT: Pre-training of Deep Bidirectional Transformers for Language Understanding," arXiv:1810.04805v2, May 24, 2019, pp. 1-16.

Peters, M.E. et al., "Deep contextualized word representations," arXiv:1802.05365v2, Mar. 22, 2018, pp. 1-15.

Shree, P., "The Journey of Open AI GPT models," Nov. 9, 2020, 13 pages, [Online] [Retrieved on Jun. 9, 2021] Retrieved from the Internet <URL: https://medium.com/walmartglobaltech/the-journey-of-open-ai-gpt-models-32d95b7b7fb2>.

* cited by examiner

Step <u>520</u>

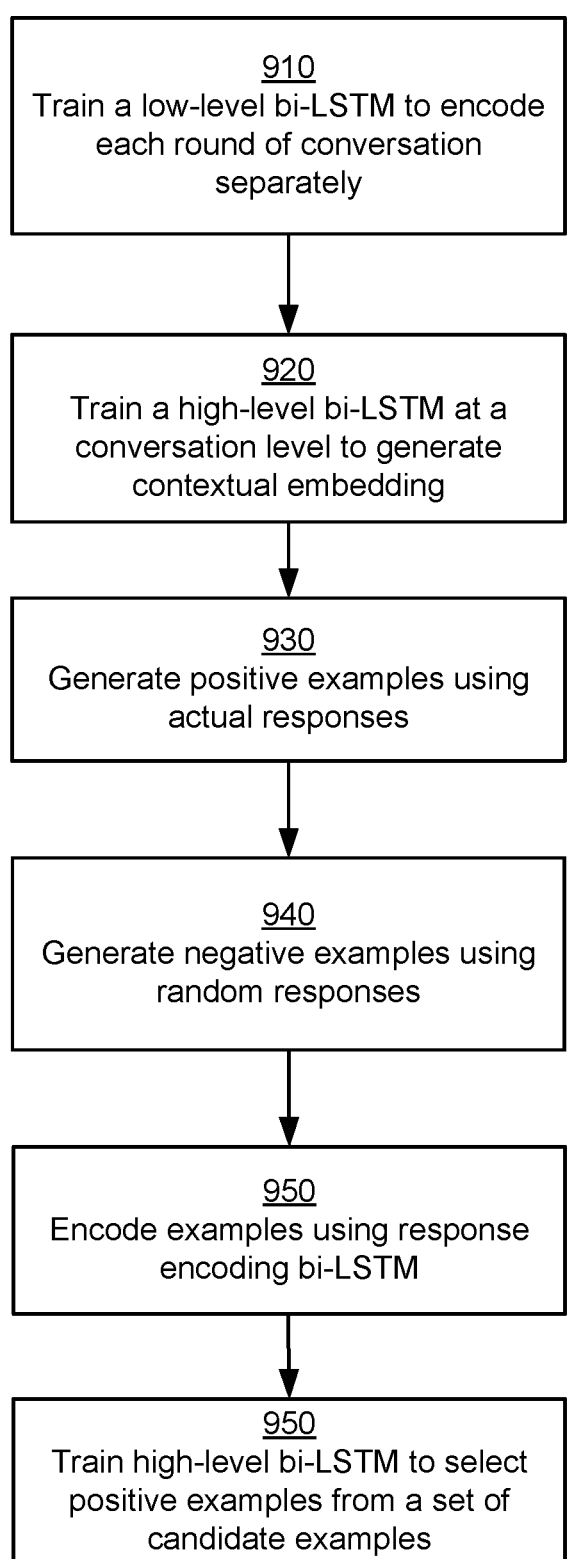

910
Train a low-level bi-LSTM to encode each round of conversation separately

920
Train a high-level bi-LSTM at a conversation level to generate contextual embedding 930
Generate positive examples using actual responses 940
Generate negative examples using random responses 950
Encode examples using response encoding bi-LSTM 950
Train high-level bi-LSTM to select positive examples from a set of candidate examples

FIG. 9

NEURAL NETWORK BASED CONVERSATION-AWARE AUTOMATIC SPEECH RECOGNITION

FIELD OF ART

The concepts described herein relate to the field of automated speech recognition, and more specifically, to the use of neural networks for performing transcriptions of speech based conversations.

BACKGROUND

Speech recognition systems process and recognize human speech and may take action or perform further processing of the speech. One of the tasks performed based on speech recognition is transcription of conversations. Transcription of speech based conversations enables downstream tasks such as entity recognition, real-time analytics, and others. Artificial intelligence (AI) techniques are used for automatic speech recognition, for example, machine learning based models such as neural networks. Examples of neural network models used for speech recognition include convolutional neural networks (CNN), recurrent neural networks (RNN), sequence-to-sequence neural network models, and so on. Conventional techniques often have low accuracy in distinguishing between similar sounding words. For example, a language model may confuse between "four" and "for" when spoken by a user. Conventional techniques for call transcription that use language models with high accuracy are computationally expensive or require large amount of computational resources.

SUMMARY

A system uses a machine learning based model such as a neural network for transcribing audio inputs, for example, audio inputs representing a conversation. The system receives a set of audio inputs representing utterances of a conversation. For each conversation, the system determines a dialogue state for each utterance. The dialogue state is associated with a subset of utterances of the conversation and is represented by a dialogue state. The system trains a hierarchical language model for transcribing audio inputs using the received conversations. The hierarchical language model includes a top-level language model and a plurality of lower-level language model. The training is performed by (1) training the top-level language model using sequences of dialogue states, each sequence of dialogue states for a conversation, and (2) for each dialogue state, training a lower-level language model using utterances having that dialogue state. The system executes the hierarchical language model to transcribe audio input of new conversations.

In an embodiment, the system determines a dialogue state for each utterance of the conversation as follows. The system segments a conversation into rounds. A round represents a pair of consecutive utterances in the conversation. The system performs clustering of the rounds to determine clusters and associates each cluster with a dialogue state.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 9 is a flowchart illustrating the process for training an utterance encoding model for encoding utterances of a conversation, according to an embodiment.

The figures depict embodiments for purposes of illustration only. One skilled in the art will readily recognize from the following description that alternative embodiments of the structures and methods illustrated herein may be employed without departing from the principles described herein.

DETAILED DESCRIPTION

Figure 1:
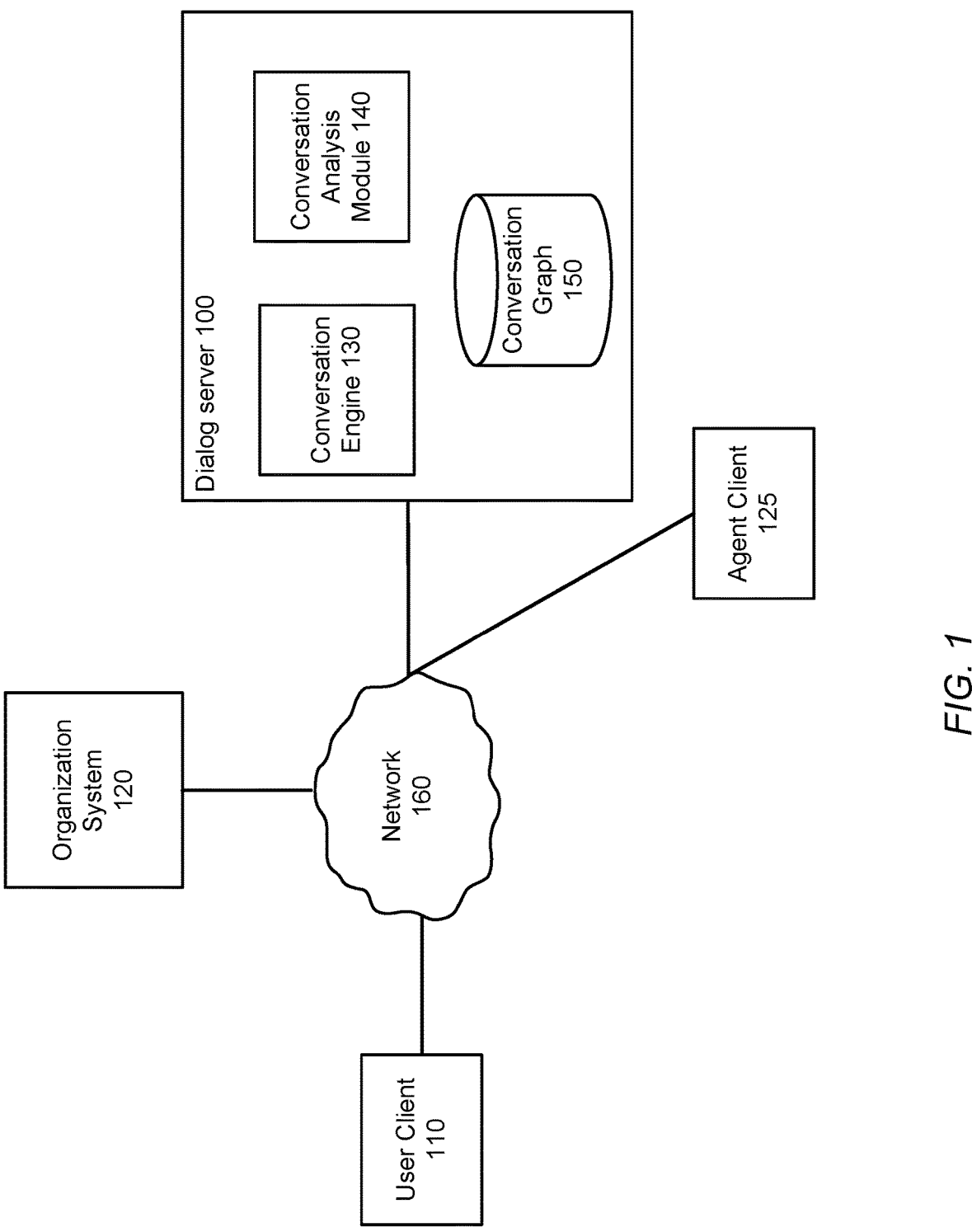
FIG. 1 illustrates an environment in which an organization uses a dialog server to handle its interactions with users, according to one embodiment.

FIG. 1 illustrates an environment in which an organization uses a dialog server to handle its interactions with users, according to one embodiment. An organization system 120 is visited by users using their user clients 110, e.g., for the purpose of asking questions, using functionality, or otherwise interacting with the organization system. The interaction mechanism could be as simple as a telephone switchboard or as complex as a digital virtual assistant—via voice. The organization systems 120 stores the agent/client conversations, e.g., as voice recordings. In some cases, the dialog server 100 may have difficulty in directly interpreting and responding to a user's conversation. In such cases, the dialog server 100 may delegate some or all of the conversation to a humans by sending the conversation data to the human agent client 125, and the humans can then handle responses to the user on behalf of the dialog server 100.

Generally, the responsibility of interpreting and responding to user conversations can be apportioned between the conversation engine 130 of the dialog server 100, and the humans using the agent client 125, in any appropriate manner; thus, conversations may be between a human user and an automated system, or between a human user and another human, or any combination thereof. The dialog server 100 may have a conversation engine 130 and a conversation analysis module 140. These components are now described in additional detail.

In some embodiments, the conversation engine 130 handles conversations with users, e.g., when the conversations are delegated to the dialog server by the organization system 120. The conversation may include audio inputs, i.e., speech inputs. The conversation analysis module 140 ana- lyzes conversations of users. For example, the conversation analysis module 140 infers the various conversation paths that are possible within the conversations. The conversation analysis module 140, includes Automated Speech Recogni- tion (ASR), which performs class transcription to convert audio data from conversations into text data. Audio data may also be referred to as audio input, speech data, or speech input. The result of transcription of the audio input may be used for further processing, for example, for analytics of the conversations. The analysis performed by the conversation analysis module 140 may be used to automatically or semi-automatically generate data conversations so that the dialog server 100 can better provide automated support for the current conversation and for similar conversations in the future. The conversation analysis module 140 is described below in greater detail with respect to FIG. 2.

The user 110, and agent, 125, clients are devices such as smart phones, telephones, laptop computers, desktop com- puters, or any other device that can interact with a network 160. The network 160 may be any suitable communications network for data transmission. In an embodiment such as that illustrated in FIG. 1, the network 160 uses standard communications technologies and/or protocols and can include the Internet. In another embodiment, the entities use custom and/or dedicated data communications technologies.

The environment of FIG. 1 is one example of an envi- ronment in which the conversation analysis module 140 can be used. More generally, the conversation analysis module 140 accepts stored dialogs/conversations as input and ana- lyzes that input to infer to the structure of conversations. That inferred structure can then be used by other (or the same) systems to analyze conversations. The conversation analysis module 140 can thus be used within environments different from those of the example of FIG. 1., and need not be part of a dialog server 100. For example, in other embodiments, there need not be a dialog server 100; rather, there may instead just be some form of simple recording mechanism that saves the stored conversation that serve as the input to the conversation analysis module 140.

Figure 2:
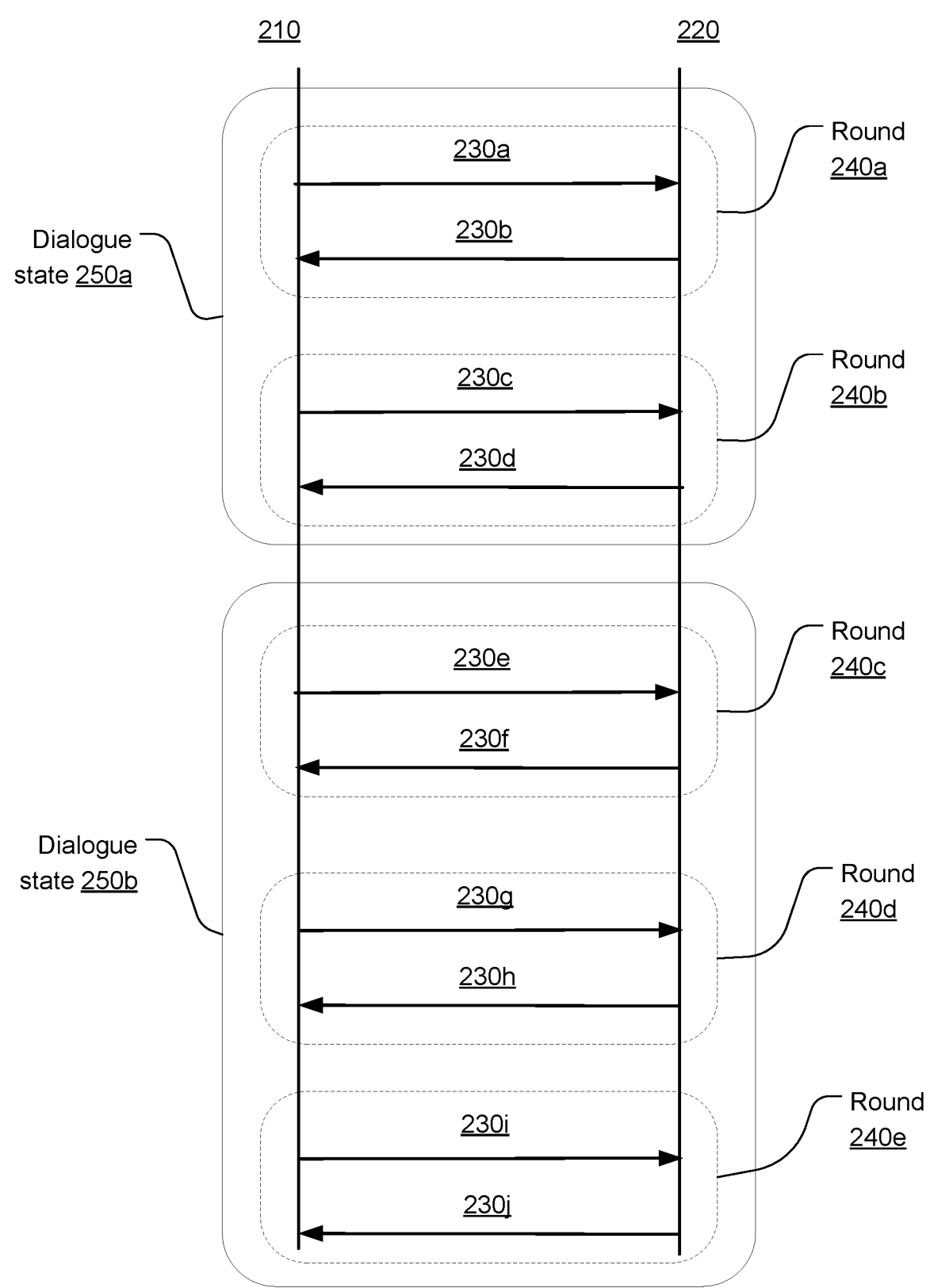
FIG. 2 illustrates conversations, rounds, and clusters of rounds associated with dialogue states, according to some embodiments.

FIG. 2 illustrates conversations, rounds, and clusters of rounds associated with dialogue states, according to some embodiments. As shown in FIG. 2, the conversation occurs between two participants 210 and 220. A participant may be a user, a human agent, an automatic agent, or any other entity that can perform a conversation. For example, the conversation may be between an agent that represents a human associated with the online system and another user, for example, a customer associated with the online system. The conversation may be between an automatic agent and a user. For sake of simplicity, we refer to the participants 210 and 220 as users, although the techniques disclosed apply to conversations between any other types of participants, for example virtual assistants.

The conversation shown in FIG. 2 includes several utter- ances 230. As shown in FIG. 2, the user 210 makes an utterance 230*a* to user 220 and in response the user 220 makes an utterance 230*b*. An exchange of utterances between the two participants of the conversation is referred to as a round. Accordingly, a round 240 represents a pair of utterances (u1, u2). FIG. 2 shows examples of rounds including round 240*a* including utterances (230*a*, 230*b*), round 240*b* including utterances (230*c*, 230*d*), round 240*c* including utterances (230*e*, 230*f*), round 240*d* including utterances (230*g*, 230*h*), and round 240*e* including utter- ances (230*i*, 230*j*).

The conversation analysis module 140 analyzes conver- sations to identify states associated with conversations. A state of conversation corresponds to a set of rounds that are related. For example, a conversation may include exchanges of utterances that are performed for various reasons, for example, an agent may perform (1) a set of rounds for determining the name of the user, (2) a set of rounds for determining what is the reason for the call, (3) a set of rounds to inform the user of certain product or service, (4) a set of rounds for payment related to a transaction, and so on. Each set of rounds may correspond to a state of con- versation, also referred to as a dialog state. FIG. 2 illustrates two dialogue states 250*a* and 250*b*. The dialogue state 250*a* includes the rounds 240*a* and 240*b* and the dialogue state 450*b* includes the rounds 240*c*, 240*d*, 240*e*. The conversa- tion analysis module 140 determines an identifier each dialogue state. The identifier for a dialogue state is referred to as a dialogue state tag (DST). Following is an example conversation between an agent and a user, for example, a customer. Sample dialogue state tags are associated with each utterance.

| Participant | Utterance | DST |
|---|---|---|
| Agent | thank you for choosing company xyz my name is bob may i have your first and last name please | _NAME_ |
| User | my first name is john my last name is smith smith | _NAME_ |
| Agent | thank you john and what is the passcode please | _CODE_ |
| User | that code is one two three four | _CODE_ |
| Agent | very good i appreciate that and how can i help you | _HOWHELP_ |
| User | i'm calling to buy product abc | _HOWHELP_ |
| Agent | okay and how would you like to pay | _PAYMENT_ |
| User | credit card | _PAYMENT_ |
| Agent | what's the number on the card | _CREDIT_CARD_ |
| User | four four four four four four four four four four four four four | _CREDIT_CARD_ |
| Agent | thank you and the expiration date please | _EXIRATION_DATE_ |
| User | august twenty four | _EXIRATION_DATE_ |
| Agent | and the code on the back of the card | _CVV_ |
| User | four four four | _CVV_ |
| Agent | and finally the zipcode | _ZIP_ |
| User | zipcode is four four four four four | _ZIP_ |
| Agent | very good and can you confirm the payment | _CONFIRM_ |
| User | yes | _CONFIRM_ |
| Agent | ok you are all set and is there anything else i can help you with | _END_ |
| User | no that's it thank you | _END_ |

The various dialogue states include (1) a state with DST_NAME_that represents a set of rounds for getting the name of the user, (2) a state with DST_CODE_that repre- sents a set of rounds for getting a passcode from the user, (3) a state with DST_HOWHELP_that represents a set of rounds for identifying how the agent can help the user, (4) a state with DST_PAYMENT_that represents a set of rounds for determining how the user is going to make payment, (5) a state with DST_CREDIT_CARD_that represents a set of rounds for receiving the credit card number of the user, and so on.

System Architecture

Figure 3:
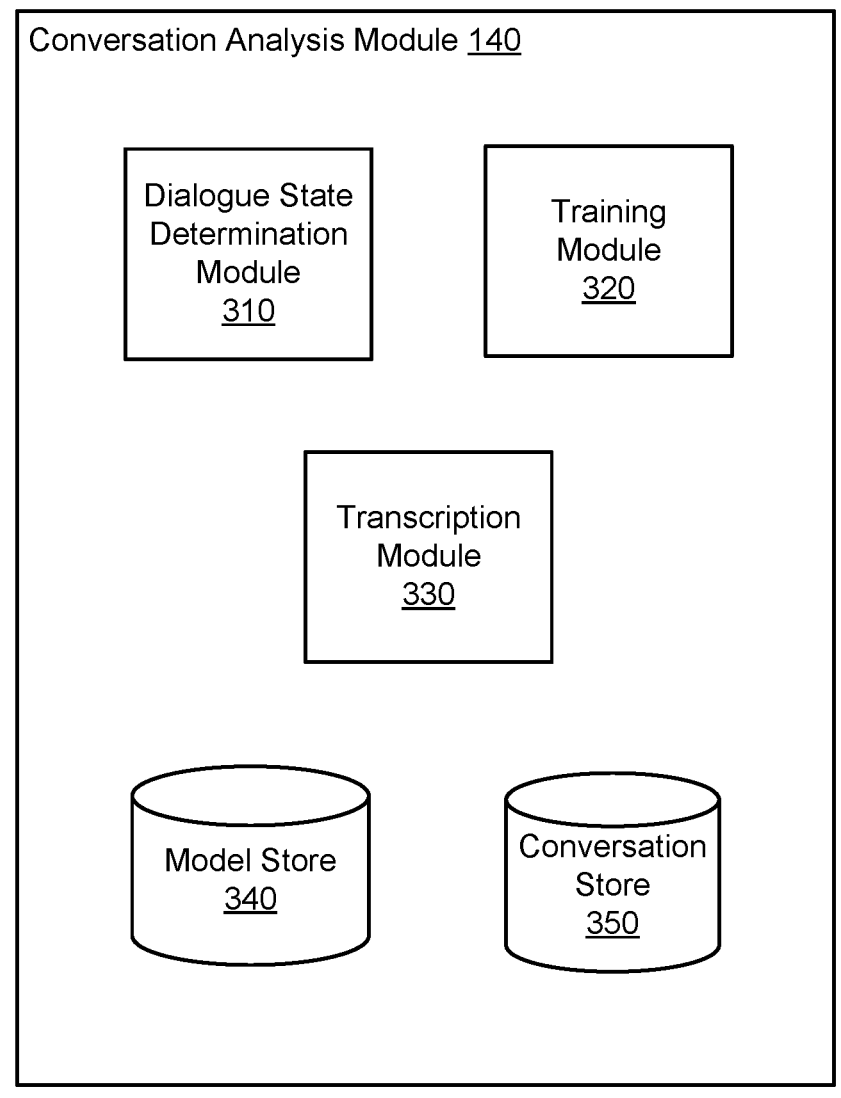
FIG. 3 is a high-level block diagram illustrating the system architecture a speech processing module, according to one embodiment.

FIG. 3 is a high-level block diagram illustrating the system architecture a speech processing module, according to one embodiment. The conversation analysis module 140 includes a dialogue state determination module 310, a training module 320, a transcription module (ASR) 330, a model store 340, and a conversation store 350. Other embodiments may include other modules than those indicated herein.

The conversation store 350 stores conversations between participants and metadata describing the conversations. The conversation store 350 may be a relational database that stores the information describing conversations as relational tables. For example, the relational table may include columns that store utterances, the participant that performed the utterance, a timestamp for the utterance, conversation identifiers, dialogue state tags for utterances, and so on. The remaining modules access the conversation information for processing.

In an embodiment, the conversation store 350 represents a conversation as a conversation graph, which describes a set of conversation states and the transitions between them, to determine how to conduct the conversation. For example, the conversation graph is used when responding to users who are customers of an airline organization might specify that the initial conversation state should provide a greeting and inquire what the user wishes to do, that various user responses lead to states corresponding to booking a plane ticket, checking flight schedules, requesting a refund, and the like.

The model store 340 stores the machine learning models used for processing speech data from the conversations. In an embodiment, the machine learning based model is a hierarchical language model further illustrated in FIG. 4 and described in connection with FIG. 4. The dialogue state determination module 310 processes a set of conversations to determine the various possible dialogue states. The dialogue state determination module 310 may further analyze the dialogue states to determine labels and tags for the dialogue states. The training module 320 trains the hierarchical language model used for processing the audio input. The transcription module 330 executes the trained hierarchical language model to perform transcription of conversations received by the conversation analysis module 140. Hierarchical language models for speech processing are described in the U.S. Pat. No. 10,096,317, filed on Apr. 18, 2016, and issued on Oct. 9, 2018, titled "Hierarchical speech recognition decoder," which is incorporated by reference herein in its entirety.

Hierarchical Language Model for Speech Recognition

Figure 4:
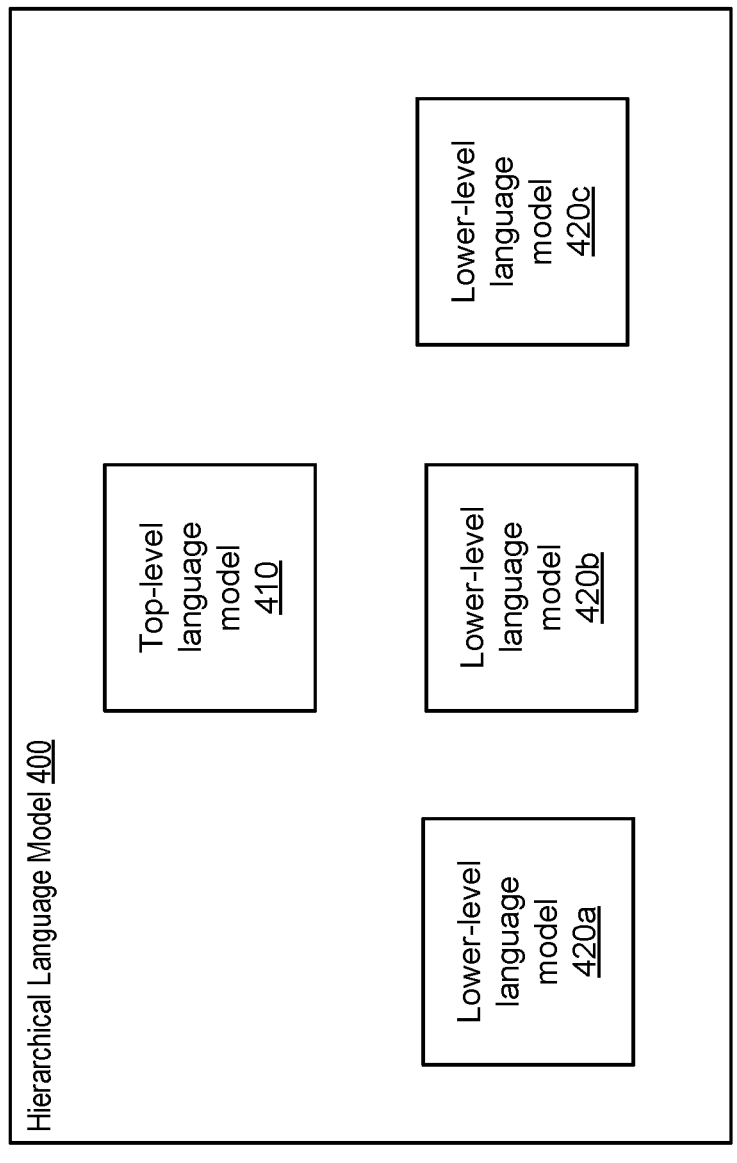
FIG. 4 is a high-level block diagram illustrating a hierarchical language model, according to one embodiment.

FIG. 4 is a high-level block diagram illustrating a hierarchical language model, according to one embodiment. The hierarchical language model 400 includes a top-level language model 410 and a plurality of lower-level language models 420a, 420b, 420c, and so on. According to an embodiment, a language model (LM) used in transcription of audio inputs of a conversation may be n-gram backoff model trained on the utterances' text.

Conventional techniques for real-time transcription of conversations use a single (or monolithic) language model (LM) throughout the whole conversation. The traditional language model predicts the next word given a sequence of previous n−1 words. As shown by following equation (1), the conversation may be represented as a sequence W, such that the probability of occurrence of Wis based on the sequence of words and there is no embedding of conversation-state.

$$Pr[W] = \prod\nolimits_{i=1}^{k} Pr\left[w_i \middle| w_{i+n-1}^{i-1}\right] \qquad (1)$$

In contrast, system according to an embodiment disclosed analyzes conversations to determine various dialog states in the conversation. Each dialog state is represented using a dialog state tag (DST). The system uses the hierarchical language model in which the top-level language model 410, is an n-gram model trained on the sequence of DSTs and the lower-level language models 420, are trained on DST-specific utterances.

To build the hierarchical language model 400, the training dialogues are clustered and tagged. For example, the dialogue sample given above between an agent and user is converted into a sequence of DSTs: NAME_ NAME_ _CODE_ _CODE_ _HOWHELP_ _ HOWHELP_ _PAYMENT_ _PAYMENT_ _ CREDIT_CARD_ _CREDIT_CARD_ _ EXIRATION_DATE_ _EXIRATION_DATE_ _ CVV_ _CVV_ _ZIP_ _ZIP_ _CONFIRM_ _ CONFIRM_ _END_ _END_.

Furthermore, utterances that are assigned to a specific DST are collected across various conversations and are used to train a lower-level language model specific to that DST. For example, to train the lower-level language for _CREDIT_CARD_ the following utterances are used: "what is your credit card number", "that number is four four four . . . ", "the number on the card is five five five . . . ", "credit card", "debit card", and "four five four five . . . ".

The DST-based hierarchical LM can be represented using the following equation (2):

$$Pr[W] = \prod\nolimits_{t=1}^{T} Pr\left[DST_t \middle| DST_{t-m+1}^{t-1}\right] \times \prod\nolimits_{i=1}^{k_t} Pr\left[w_i \middle| DST_t, w_{i+n-1}^{i-1}\right] \qquad (3)$$

In a dialogue with T utterances, $$\prod\nolimits_{i=1}^{k_t} Pr\left[w_i \middle| DST_t, w_{i+n-1}^{i-1}\right]$$

is the probability of being at the dialogue state $DST_t$ given the previous m−1 states which is computed by the top-level language model. The term $$Pr\left[DST_t \middle| DST_{t-m+1}^{t-1}\right]$$

represents the probability of $w_i$ given $DST_t$ and n−1 previous words which is computed by the lower-level language corresponding to $DST_t$ and $k_t$ represents the total number of the words at the $t^{th}$ utterance of the dialogue. Accordingly, the probability of a word from an utterance is determined based on the dialog state in which the utterance occurs.

This techniques performs better than conventional techniques that use a single language model for the entire conversation since certain words tend to have different probabilities in different states of the dialogue. For example, the hierarchical language model predicts better probability for Pr[four|that number is] than Pr[for|that number is] in response to the agent's question "what isyour credit card number". Because at this state of the dialogue (i.e. "_PAY-MENT_"), the corresponding lower-level language model is mainly trained on sequence of digits and credit card information.

Figure 5:
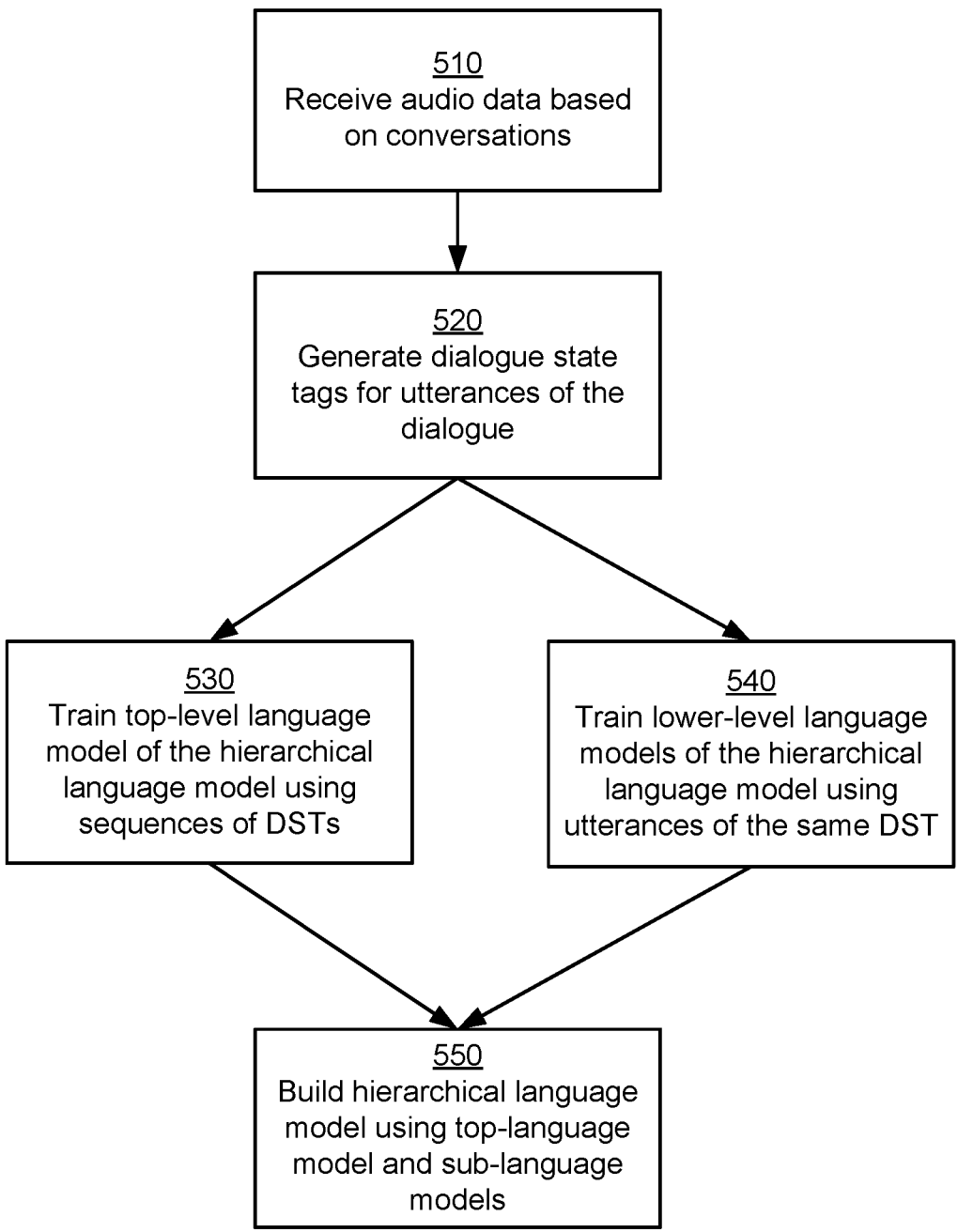
FIG. 5 is a flowchart illustrating the process of building a hierarchical language model, according to some embodiments.

FIG. 5 is a flowchart illustrating the process of building a hierarchical language model, according to some embodiments. The conversation analysis module 140 receives audio data based on conversations. The conversation analysis module 140 uses a set of conversations, for example, a few thousand conversations. The conversations may be associated with a particular organization or enterprise.

Figure 6:
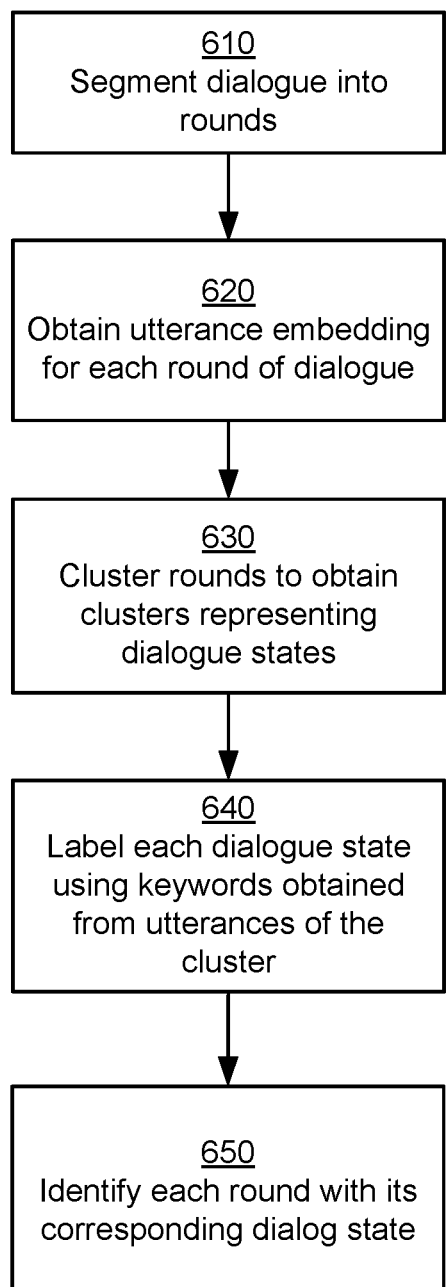
FIG. 6 is a flowchart illustrating the process for defining dialogue states, according to some embodiments.

The conversation analysis module 140 generates dialogue state tags for utterances of the dialogue. The process for generating dialogue state tags is illustrated in FIG. 6 and further described in detail in connection with FIG. 6.

The conversation analysis module 140 trains the top-level language model 410 of the hierarchical language model 400 using sequences of DSTs that for conversations. The conversation analysis module 140 trains lower-level language models 420 of the hierarchical language model 400 using utterances of specific DSTs. For example, the conversation analysis module 140 may train a specific lower-level language model corresponding to each DST using utterances that are classified as having that particular DST from the various conversations.

The conversation analysis module 140 combines the top-level language model 410 and the plurality of lower-level language models 420 to obtain the hierarchical language model 400. The trained hierarchical language model 400 is used for processing any new conversations that are received.

Dialogue State Tags

FIG. 6 is a flowchart illustrating the process for defining dialogue state tags, according to some embodiments. The conversation analysis module 140 segments 610 conversations into rounds, for example, pairs of utterances, one from an agent and the corresponding utterance from the user.

The conversation analysis module 140 obtains 620 utterance embedding for each round of dialogue. The conversation analysis module 140 obtains an utterance embedding for each round of the dialogues via dialogue pre-training that is conducted directly on the set of conversations, for example, conversations of an organization. The utterance embedding represents an utterance as a dense vector, which compresses both the content of the conversation round and its dialogue context.

The conversation analysis module 140 may use different approaches to compute the utterance embeddings. For example, the conversation analysis module 140 may use pre-trained language models such as ELMO, BERT, GPT-2, and so on.

The conversation analysis module 140 clusters 630 rounds to obtain a plurality of clusters, each cluster representing a dialogue state. In an embodiment, the conversation analysis module 140 runs a clustering method, for example, K-means clustering or hidden Markov model (HMM) based clustering of the utterance embeddings to obtain various dialogue states.

The conversation analysis module 140 labels 640 each dialogue state using keywords obtained from utterances of the cluster. In an embodiment, the labels are obtained from term frequency-inverse document frequency (TF-IDF) statistics within each cluster. TF-IDF is a numerical statistic which reflects the significance of a word in a document. The terms of the label may be used to generate a DST for a dialog state. The conversation analysis module 140 tags 650 each round with its corresponding DST.

Labeling of Clusters

To generate cluster labels for clusters, the system extracts representative terms from rounds in each cluster and uses them as cluster labels. Representative terms are a finite set of tokens (i.e., words) that represent a cluster. A cluster is associated with a cluster index.

Figure 7:
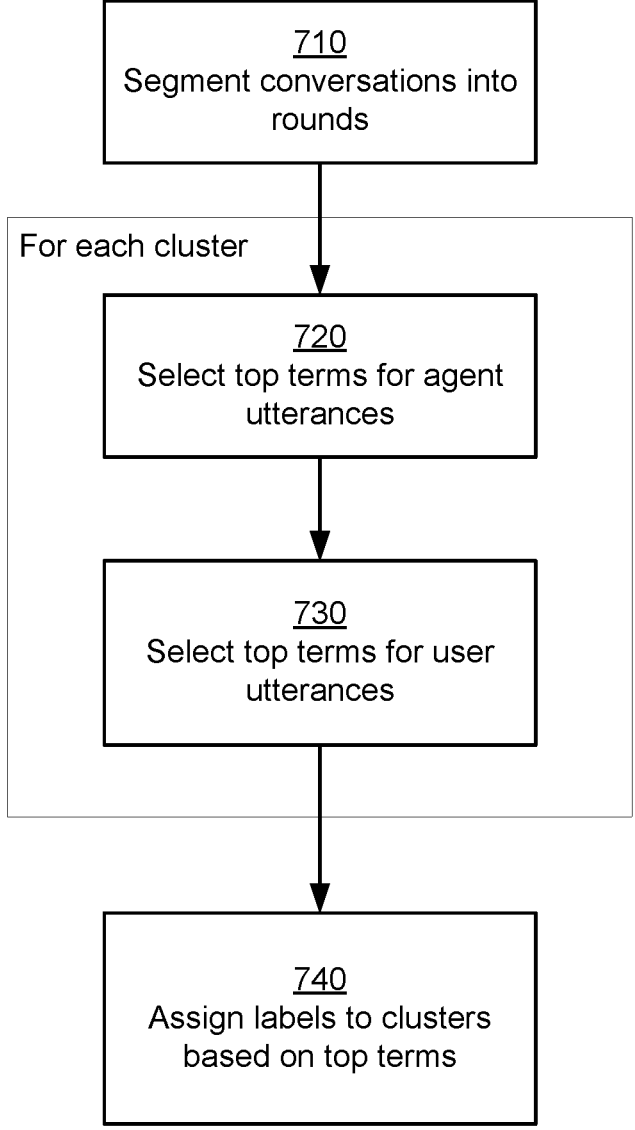
FIG. 7 is a flowchart illustrating the process for assigning labels to clusters of rounds in conversations, according to some embodiments.

FIG. 7 is a flowchart illustrating the process for assigning labels to clusters of rounds in conversations, according to some embodiments.

The conversation analysis module 140 segments 710 conversations into rounds and determines clusters of rounds corresponding to different dialogue states. The conversation is assumed to be between an agent and a user.

The conversation analysis module 140 repeats the steps 720 and 730 for each cluster of rounds. The conversation analysis module 140 selects 720 the top terms for user, 210, utterances. In an embodiment, the conversation analysis module 140 selects the top terms for this user's utterances by vectorizing them using a TF-IDF vectorizer and multiplying the vectors with a one-hot representation of the cluster indices of the rounds in the dialogues. The conversation analysis module 140 selects the user, 210, representative terms of cluster indices by picking the top few (for example, three) terms, i.e., TF-IDF feature names. The conversation analysis module 140 selects 730 the top terms for the user, 220, utterances using a similar process. The result of the clustering is the assignment 740 of a cluster index and label to each round in the corpus of dialogs. After dialog clustering, each individual dialog is represented as a sequence of dialogue state tags (DST).

The conversation analysis module 140 assigns 740 labels to the clusters based on the top terms for user, 220, utterances and the top terms for the user, 210, utterances. For example, the conversation analysis module 140 may generate a label for a cluster by concatenating the top terms for agent utterances and the top terms for the user utterances.

Utterance Encoding Model

The details of the model used for encoding an utterance are described herein. The conversation analysis module 140 encodes utterances using an utterance encoding model (also referred to herein as a response encoding model). In an embodiment, the utterance encoding model is a hierarchical Bi-LSTM. Assume the $i^{th}$ dialogue in the dataset contains T consecutive rounds of conversations: U(i)=[u(1), u(2), . . . , u(t), . . . , u(T)], where u(t) contains an utterance pair between agent and customer. For the $i^{th}$ dialogue, the system randomly samples K rounds of conversations independently from the full dataset: R(i)=[r(1), r(2), . . . , r(K)]. These K rounds of conversations (also called negative examples) are not necessarily consecutive, and can come from different dialogues, and there are different R(i) for each dialogue i. The hierarchical Bi-LSTM model can be expressed as follows:

$$\text{Low-level Bi-LSTM: } h(t)=\text{Lower}(u(t))(t=1,2,\ldots,T) \quad (1)$$

$$\text{High-level Bi-LSTM: } [c(1),c(2),\ldots,c(T)]=\text{Higher}(h(1),h(2),\ldots,h(T)) \quad (2)$$

$$\text{Utterance encoding Bi-LSTM: } \text{pos}(t)=\text{Encoder}(u(t)) \\ (t=1,2,\ldots,T) \quad (3)$$

$$\text{neg}(k)=\text{Encoder}(r(k)) \ (k=1,2,\ldots,K) \quad (4)$$

Figure 8:
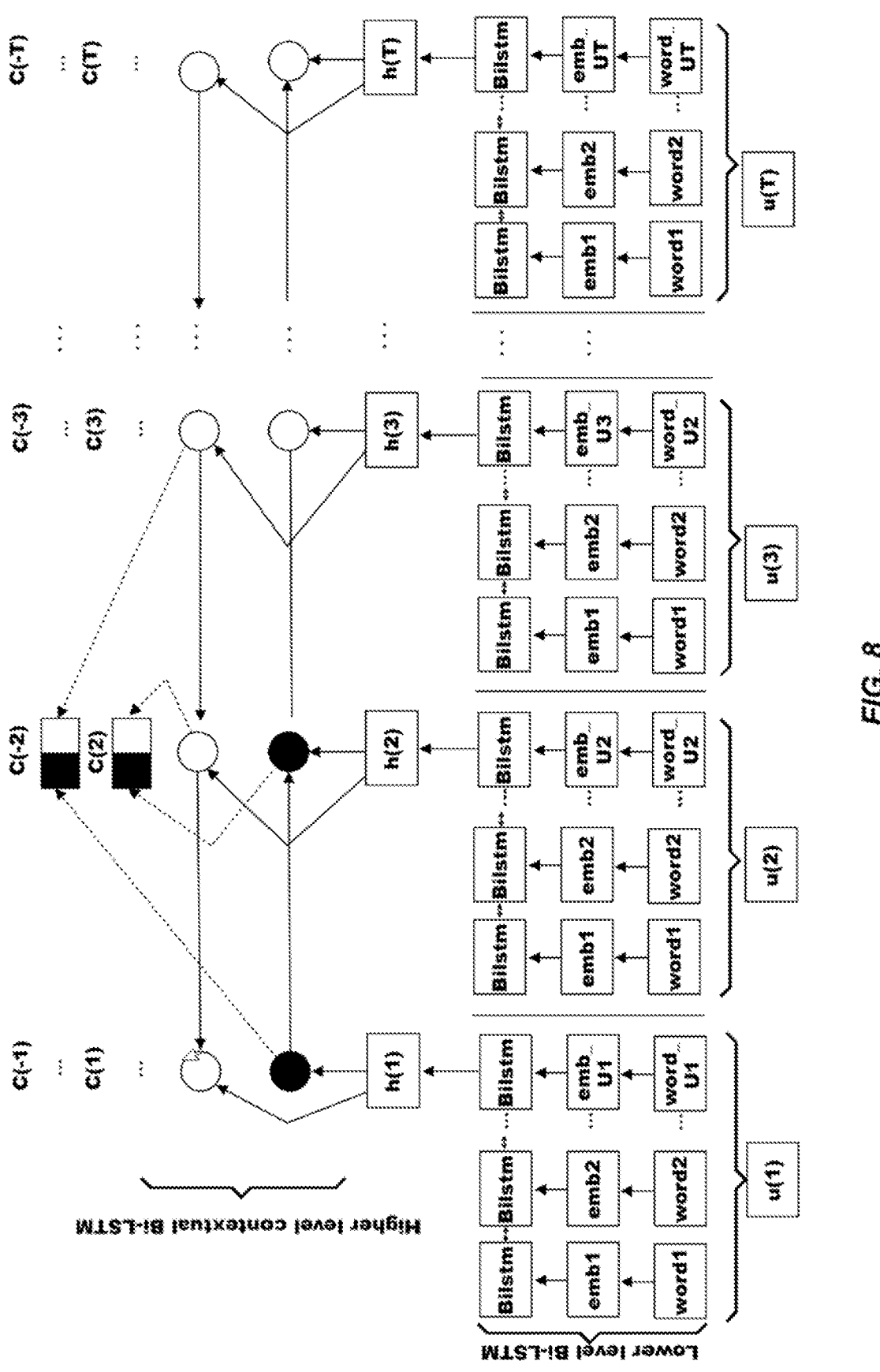
FIG. 8 illustrates the structure of a hierarchical Bi-LSTM representation of dialog rounds, according to some embodiments.

FIG. 8 illustrates a bi-directional long short term encoding of conversation rounds into a higher level summaries, according to an embodiment. A dialog is composed of a sequence of conversation rounds, and each round is again composed of a sequence of words. To leverage this hierarchical information in the pretraining process, the following dialog pretraining model structure is used. The conversation analysis module 140 first uses lower level Bi-LSTM 810 (Bi-directional Long Short Term Memory) to encode each dialog round separately in order to obtain a dense vector representation h(t). Notice that this representation alone cannot effectively be used for clustering, since it is context-independent. That is, since each round is encoded separately, without using any information of the dialog context before or after it, it is lacking in context. Accordingly, the conversation analysis module 140 further uses a higher-level Bi-LSTM 820 at the dialog level, which takes the set of the above context-independent representation h(t) as input and generates a contextual embedding [c(1), c(2), . . . , c(T)] for each round of the dialog. (Note that in this embodiment, the lower-level and higher-level Bi-LSTM''s together constitute the pre-trained model that the conversation analysis module 140 applies to the stored dialogs, and are collectively referred to as a 'hierarchical Bi-LSTM model.').

FIG. 9 is a flowchart illustrating the process for training an utterance encoding model for encoding utterances of a conversation, according to an embodiment. The conversation analysis module 140 trains 910 low-level Bi-LSTMs to encode each round of dialogue separately, to generate a dense vector representation. The conversation analysis module 140 trains 920 a high-level Bi-LSTM, 230, on the conversation level. The high level Bi-LSTM takes the above context-independent representation generated by the low-level Bi-LSTMs as input, and generates contextual embedding for each round of the dialogue.

The examples are encoded using a third Bi-LSTM (called response encoding Bi-LSTM). The conversation analysis module 140 generates 930 positive example using actual responses from conversations. The conversation analysis module 140 generates 940 negative examples using random responses sampled from the set of utterances in the conversations.

The conversation analysis module 140 encodes examples using the response encoding bi-LSTM. The model to select the positive example from all the candidate examples.

The conversation analysis module 140 trains 950 the high-level bi-LSTM to select positive examples from a set of candidate examples.

Technological Improvements

The proposed hierarchical language model structure exploits the dialogue state information without adding any time delay in the real-time transcription task. The system disclosed provides better accuracy of automatic speech recognition. The system disclosed enables a more accurate ASR which uses conversation-state-aware lower-level language models in different states of the dialogue. The system uses the dialogue flow structure within the data itself, through the pre-training/clustering paradigm explained above, and no meta-information (such as business rules, application domain) is needed for this process. Therefore, the system is applicable to a much broader range of applications than systems based on customer-dependent rules.

Huge neural network based LMs may be able to use the full context in order to compute the probability of the next word and they can also remember the state of the dialogue. However, these models such as Bert, GPT-2, GPT-3 etc. are extremely expensive such that multiple GPUs are needed to run them in real-time speed and they are too big to be used inside the ASR decoder. In contrast, the system disclosed does not require expensive hardware but is able to produce better quality results. The systems disclosed provides a solution to a problem of expensive way to replace language models in automated speech recognition. Use of different language models in different states of the automated speech recognition is not feasible in real-time transcription due to expensive computation that would be needed for constantly replacing the language model in the automated speech recognition decoder.

Alternative Embodiments

Alternative approaches can be used to achieve dialogue analysis. For example, in some embodiments, transformers neural network are used instead of Bi-LSTMs encoders. In other embodiment, a single flat model is used to encode the full dialogue, rather than the hierarchical model. Other embodiments use alternative clustering methods such as hierarchical agglomerative clustering or hidden markov models. An embodiment uses a joint pre-training/clustering model, rather than separating it into two steps. An embodiment pretrains the model on generic (out of domain) dialogues before focusing on an organization's in-domain data.

The system may run in offline mode. In an offline mode, the system runs a 1st-pass of ASR on the whole dialogue, classifies each turn to detect the state of the turn and then runs a 2nd-pass using state-specific LM. In an embodiment, the system trains channel-specific LMs. A channel refers to a source of utterances, for example, an agent or a user. Accordingly, the system trains separate LMs for agent and customer channels.

Computer Architecture

Figure 10:
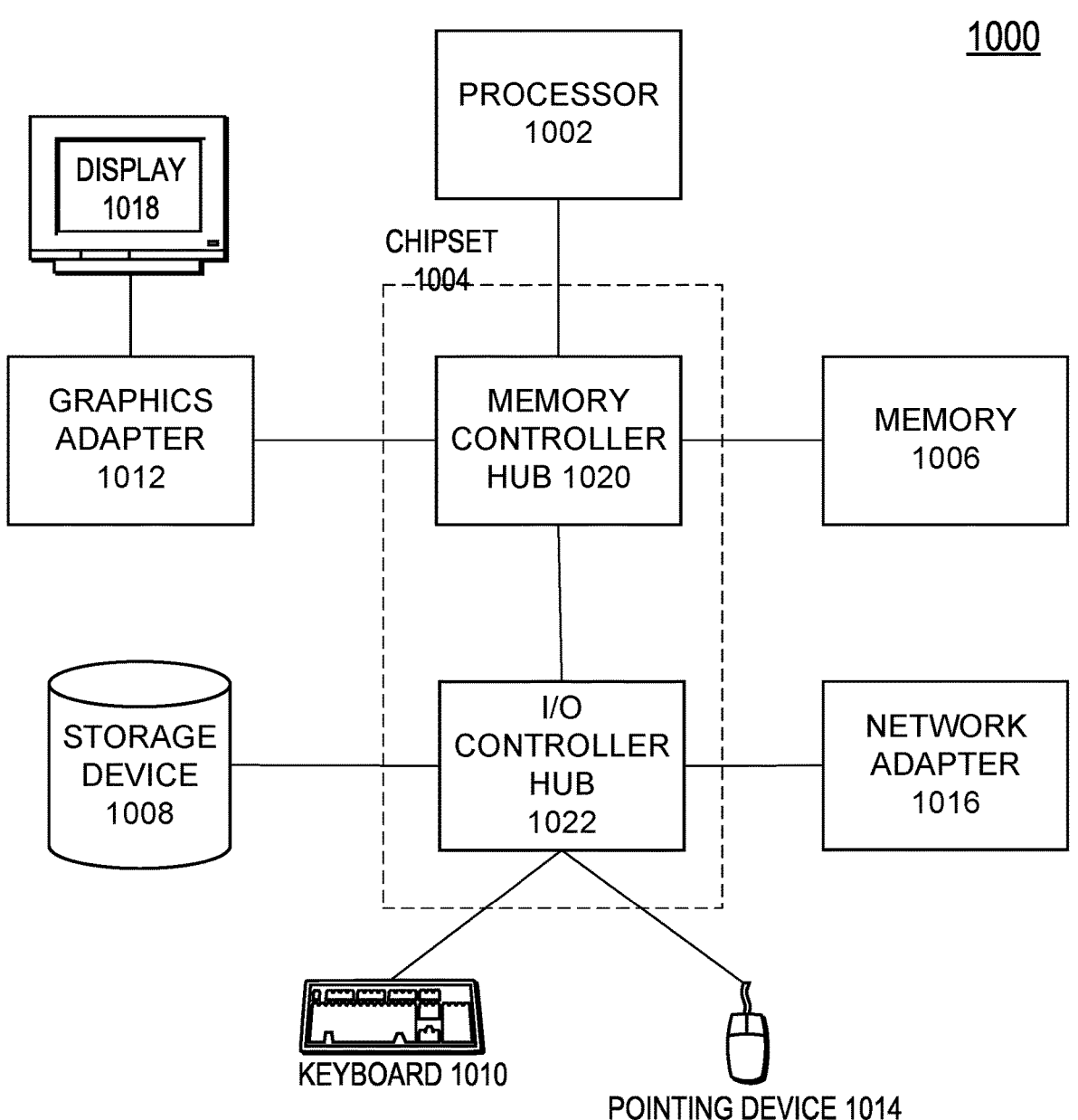
FIG. 10 is a high-level block diagram illustrating physical components of a computer used as part or all of the online system or the client devices from FIG. 1, according to one embodiment.

FIG. 10 is a high-level block diagram illustrating physical components of a computer 1000 used as part or all of the online system or the client devices, according to one embodiment. Illustrated are at least one processor 1002 coupled to a chipset 1004. Also coupled to the chipset 1004 are a memory 1006, a storage device 1008, a graphics adapter 1012, and a network adapter 1016. A display 1018 is coupled to the graphics adapter 1012. In one embodiment, the functionality of the chipset 1004 is provided by a memory controller hub 1020 and an I/O controller hub 1022. In another embodiment, the memory 1006 is coupled directly to the processor 1002 instead of the chipset 1004.

The storage device 1008 is any non-transitory computer-readable storage medium, such as a hard drive, compact disk read-only memory (CD-ROM), DVD, or a solid-state memory device. The memory 1006 holds instructions and data used by the processor 1002. The graphics adapter 1012 displays images and other information on the display 1018. The network adapter 1016 couples the computer 1000 to a local or wide area network.

As is known in the art, a computer 1000 can have different and/or other components than those shown in FIG. 10. In addition, the computer 1000 can lack certain illustrated components. In one embodiment, a computer 1000 acting as a server may lack a graphics adapter 1012, and/or display 1018, as well as a keyboard or pointing device. Moreover, the storage device 1008 can be local and/or remote from the computer 1000 (such as embodied within a storage area network (SAN)).

As is known in the art, the computer 1000 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1008, loaded into the memory 1006, and executed by the processor 1002.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A computer-implemented method for generating a machine learning based model for transcribing audio inputs, the computer-implemented method comprising:

receiving a set of audio inputs;

determining a set of conversations from the set of audio inputs, wherein a conversation comprises a plurality of rounds, each round representing an exchange of utterances between participants of the conversation;

for each conversation, determining a respective dialogue state for each utterance of the conversation, wherein each respective dialogue state corresponds to a set of rounds of the conversation that are related, the dialogue state corresponding to a cluster of utterance embeddings obtained by encoding utterances using a hierarchical encoding model comprising (1) a plurality of low-level encoding models, each low-level encoding model configured to generate a context-independent embedding for a dialog round, and (2) a high-level encoding model configured to receive as input a set of context-independent embeddings for a dialog round and output a contextual embedding for the dialog round, wherein training the low-level encoding model and the high-level encoding model includes using a set of positive and negative examples, wherein a positive example includes a dialog round and a positive response generated based on an actual response to the dialog round, and a negative example includes the dialog round and a negative response generated based on a random response from a corpus of dialogs;

training a hierarchical language model for transcribing audio inputs of a conversation using the set of conversations, the hierarchical language model comprising a top-level language model and a plurality of lower-level language models, the training comprising:

training the top-level language model using sequences of the respective dialogue states determined for the set of conversations, each sequence of dialogue states for a particular conversation in the set of conversations, the top-level language model trained to predict a probability of occurrence of a particular dialogue state, given a sequence of previous dialogue states in a corresponding conversation, and for each dialogue state, training a plurality of lower-level language models, wherein each lower language model is trained for a source of utterance, each lower language model trained using utterances from the source having that dialogue state, the lower-level language model trained to predict the probability of occurrence of a word based on an input utterance;

receiving a new audio input for a new conversation; and executing the hierarchical language model to transcribe the new audio input, the executing comprising, predicting the particular dialogue state using the top-level language model, and using a lower-level language model trained for a source of utterance, the lower-level language model corresponding to the predicted dialogue state to predict a word based on an utterance of the new audio input.

2. The computer-implemented method of claim 1, wherein each conversation is between a particular agent and a particular user, and wherein determining the particular dialogue state for an utterance of the conversation comprises:

segmenting the conversation into a set of rounds, wherein each round represents a pair of consecutive utterances comprising an utterance by the particular agent and an utterance by the particular user;

performing clustering of the set of rounds to determine a plurality of clusters; and associating each cluster in the plurality of clusters with the particular dialogue state.

3. The computer-implemented method of claim 2, wherein performing clustering of the set of rounds comprises:

determining a set of embeddings, wherein an embedding is for a round; and performing clustering of the set of embeddings.

4. The computer-implemented method of claim 2, further comprising:

identifying each dialogue state with a set of keywords based on a subset of utterances having the dialogue state.

5. The computer-implemented method of claim 4, further comprising: determining the set of keywords for the particular dialogue state based on term frequency-inverse document frequency of keywords occurring in utterances having the particular dialogue state.

6. The computer-implemented method of claim 5, wherein the particular dialogue state is associated with a particular cluster in the plurality of clusters, wherein determining the set of keywords for the particular dialogue state comprises:

receiving a set of conversations;

for each conversation in the set of conversations, for each round in the conversation, splitting the round into an agent utterance and a user utterance;

extracting a first set of keywords from agent utterances belonging to the particular cluster;

extracting a second set of keywords from user utterances belonging to the particular cluster; and combining the first set of keywords and the second set of keywords as the set of keywords.

7. The computer-implemented method of claim 1, wherein the top-level language model is an n-gram model trained on sequences of dialogue states.

8. A non-transitory computer-readable storage medium storing a hierarchical language model comprising a top-level language model and a plurality of lower-level language models, wherein the hierarchical language model is trained using steps comprising:

receiving a set of audio inputs;

determining a set of conversations from the set of audio inputs, wherein a conversation comprises a plurality of rounds, each round representing an exchange of utterances between participants of the conversation;

for each conversation, determining a respective dialogue state for each utterance of the conversation, wherein each respective dialogue state corresponds to a set of rounds of the conversation that are related, the dialogue state corresponding to a cluster of utterance embeddings obtained by encoding utterances using a hierarchical encoding model comprising (1) a plurality of low-level encoding models, each low-level encoding model configured to generate a context-independent embedding for a dialog round, and (2) a high-level encoding model configured to receive as input a set of context-independent embeddings for a dialog round and output a contextual embedding for the dialog round, wherein training the low-level encoding model and the high-level encoding model includes using a set of positive and negative examples, wherein a positive example includes a dialog round and a positive response generated based on an actual response to the dialog round, and a negative example includes the dialog round and a negative response generated based on a random response from a corpus of dialogs;

training a hierarchical language model for transcribing audio inputs of a conversation using the set of conversations, the hierarchical language model comprising a top-level language model and a plurality of lower-level language models, the training comprising:

training the top-level language model using sequences of the respective dialogue states determined for the set of conversations, each sequence of dialogue states for a particular conversation in the set of conversations, the top-level language model trained to predict a probability of occurrence of a particular dialogue state, given a sequence of previous dialogue states in a corresponding conversation, and for each dialogue state, training a plurality of lower-level language models, wherein each lower language model is trained for a source of utterance, each lower language model trained using utterances from the source having that dialogue state, the lower-level language model trained to predict the probability of occurrence of a word based on an input utterance;

receiving a new audio input for a new conversation; and executing the hierarchical language model to transcribe the new audio input, the executing comprising, predicting the particular dialogue state using the top-level language model, and using a lower-level language model trained for a source of utterance, the lower-level language model corresponding to the predicted dialogue state to predict a word based on an utterance of the new audio input.

9. The non-transitory computer-readable storage medium of claim 8, wherein each conversation is between a particular agent and a particular user, and wherein determining a corresponding dialogue state for each utterance of the conversation comprises:

segmenting the conversation into a set of rounds, wherein each round represents a pair of consecutive utterances comprising an utterance by the particular agent and an utterance by the particular user;

performing clustering of the set of rounds to determine a plurality of clusters; and associating each cluster in the plurality of clusters with the corresponding dialogue state.

10. The non-transitory computer-readable storage medium of claim 9, wherein performing clustering of the set of rounds comprises:

determining a set of embeddings, wherein an embedding is for a round; and performing clustering of the set of embeddings.

11. The non-transitory computer-readable storage medium of claim 9, wherein the hierarchical language model is trained using steps further comprising:

identifying each dialogue state with a set of keywords based on a subset of utterances having the dialogue state.

12. The non-transitory computer-readable storage medium of claim 11, wherein the hierarchical language model is trained using steps further comprising:

determining the set of keywords for a particular dialogue state based on term frequency-inverse document frequency of keywords occurring in utterances having the dialogue state.

13. The non-transitory computer-readable storage medium of claim 12, wherein the particular dialogue state is associated with a particular cluster in the plurality of clusters, wherein determining the set of keywords for the particular dialogue state comprises:

receiving a set of conversations;

for each conversation in the set of conversations, for each round in the conversation, splitting the round into an agent utterance and a user utterance;

extracting a first set of keywords from agent utterances belonging to the particular cluster;

extracting a second set of keywords from user utterances belonging to the particular cluster; and combining the first set of keywords and the second set of keywords as the set of keywords.

14. The non-transitory computer-readable storage medium of claim 8, wherein the top-level language model is an n-gram model trained on sequences of dialogue states.

15. A computer system comprising:

a computer processor; and a non-transitory computer-readable storage medium storing instructions that when executed by the computer processor cause the computer processor to perform steps comprising:

receiving a set of audio inputs;

receiving a set of audio inputs;

determining a set of conversations from the set of audio inputs, wherein a conversation comprises a plurality of rounds, each round representing an exchange of utterances between participants of the conversation;

for each conversation, determining a respective dialogue state for each utterance of the conversation, wherein each respective dialogue state corresponds to a set of rounds of the conversation that are related, the dialogue state corresponding to a cluster of utterance embeddings obtained by encoding utterances using a hierarchical encoding model comprising (1) a plurality of low-level encoding models, each low-level encoding model configured to generate a context-independent embedding for a dialog round, and (2) a high-level encoding model configured to receive as input a set of context-independent embeddings for a dialog round and output a contextual embedding for the dialog round, wherein training the low-level encoding model and the high-level encoding model includes using a set of positive and negative examples, wherein a positive example includes a dialog round and a positive response generated based on an actual response to the dialog round, and a negative example includes the dialog round and a negative response generated based on a random response from a corpus of dialogs;

training a hierarchical language model for transcribing audio inputs of a conversation using the set of conversations, the hierarchical language model comprising a top-level language model and a plurality of lower-level language models, the training comprising:

training the top-level language model using sequences of the respective dialogue states determined for the set of conversations, each sequence of dialogue states for a particular conversation in the set of conversations, the top-level language model trained to predict a probability of occurrence of a particular dialogue state, given a sequence of previous dialogue states in a corresponding conversation, and for each dialogue state, training a plurality of lower-level language models, wherein each lower language model is trained for a source of utterance, each lower language model trained using utterances from the source having that dialogue state, the lower-level language model trained to predict the probability of occurrence of a word based on an input utterance;

receiving a new audio input for a new conversation; and executing the hierarchical language model to transcribe the new audio input, the executing comprising, predicting the particular dialogue state using the top-level language model, and using a lower-level language model trained for a source of utterance, the lower-level language model corresponding to the predicted dialogue state to predict a word based on an utterance of the new audio input.

16. The computer system of claim 15, wherein each conversation is between a particular agent and a particular user, and wherein determining the particular dialogue state for an utterance of the conversation comprises:

segmenting the conversation into a set of rounds, wherein each round represents a pair of consecutive utterances comprising an utterance by the particular agent and an utterance by the particular user;

performing clustering of the set of rounds to determine a plurality of clusters; and associating each cluster in the plurality of clusters with the particular dialogue state.

17. The computer system of claim 16, wherein performing clustering of the set of rounds comprises:

determining a set of embeddings, wherein an embedding is for a round; and performing clustering of the set of embeddings.

18. The computer system of claim 16, wherein the instructions further cause the computer processor to perform steps comprising:

identifying each dialogue state with a set of keywords based on a subset of utterances having the dialogue state.

19. The computer system of claim 18, wherein the instructions further cause the computer processor to perform steps comprising:

determining the set of keywords for the particular dialogue state based on term frequency-inverse document frequency of keywords occurring in utterances having the particular dialogue state.

20. The computer system of claim 19, wherein the particular dialogue state is associated with a particular cluster in the plurality of clusters, wherein determining the set of keywords for the particular dialogue state further comprises:

receiving a set of conversations;

for each conversation in the set of conversations, for each round in the conversation, splitting the round into an agent utterance and a user utterance;

extracting a first set of keywords from agent utterances belonging to the particular cluster;

extracting a second set of keywords from user utterances belonging to the particular cluster; and combining the first set of keywords and the second set of keywords as the set of keywords.

\* \* \* \* \*